US012768825B2

(12) United States Patent
Liang et al.

(10) Patent No.: US 12,768,825 B2
(45) Date of Patent: Oct. 20, 2026

(54) FINGERPRINT SPECTRUM CONSTRUCTION METHOD FOR XIHUANG CAPSULES AND FINGERPRINT SPECTRUM

(71) Applicant: SHAANXI UNIVERSITY OF SCIENCE AND TECHNOLOGY, Xi'an (CN)

(72) Inventors: Chengyuan Liang, Xi'an (CN); Changhua Ke, Xi'an (CN); Yanzi Wang, Xi'an (CN); Yuting Liu, Xi'an (CN); Xiuding Yang, Xi'an (CN); Ying Zhou, Xi'an (CN); Jiaxuan Li, Xi'an (CN)

(73) Assignee: SHAANXI UNIVERSITY OF SCIENCE AND TECHNOLOGY, Xi'an (CN)

( * ) Notice: Subject to any disclaimer, the term of this patent is extended or adjusted under 35 U.S.C. 154(b) by 590 days.

(21) Appl. No.: 18/381,605

(22) Filed: Oct. 18, 2023

(65) Prior Publication Data

US 2024/0133851 A1 Apr. 25, 2024
US 2024/0230607 A9 Jul. 11, 2024

(30) Foreign Application Priority Data

Oct. 19, 2022 (CN) ........................ 202211281103.0

(51) Int. Cl.
*G01N 30/86* (2006.01)
*G01N 30/74* (2006.01)
(Continued)

(52) U.S. Cl.
CPC ......... *G01N 30/8686* (2013.01); *G01N 30/74* (2013.01); *G01N 30/8631* (2013.01);
(Continued)

(58) Field of Classification Search
None
See application file for complete search history.

(56) References Cited

FOREIGN PATENT DOCUMENTS

CN 109932434 * 6/2019 ............ G01N 30/02
CN 111103369 A 5/2020
(Continued)

OTHER PUBLICATIONS

Zhou, J. et al. Study on Fingerprint analysis of Xihuang Capsule by HPLC-ELSD, Chinese Traditional and Herbal Drugs, 48(11), 2219-2224 (Year: 2017).*

*Primary Examiner* — Xiaoyun R Xu

(57) ABSTRACT

A fingerprint spectrum construction method for Xihuang capsules and a fingerprint spectrum includes: S1: taking contents of a Xihuang capsule, adding a methanol-chloroform-phosphoric acid solution, and carrying out ultrasonic extraction to obtain a Xihuang capsule test solution; S2: dissolving cholic acid, hyodeoxycholic acid, deoxycholic acid, bilirubin, muscone, and myrrhone in ethanol to obtain a mixed standard solution 1; dissolving quassin, 11-carbonyl-β-boswellic acid, 11-carbonyl-β-acetyl-boswellic acid, acetyl-11α-methoxy-β-boswellic acid, and sandaracopimaric acid in methanol to obtain a mixed standard solution 2; S3: respectively carrying out chromatography on the Xihuang capsule test solution and the mixed standard solutions 1 and 2, and recording corresponding chromatograms; and S4: constructing a fingerprint spectrum of the Xihuang capsule according to the chromatogram of the Xihuang capsule test solution and the chromatograms of the mixed standard solutions 1 and 2. The method can accurately, clearly and objectively evaluate the quality of Xihuang capsules.

8 Claims, 6 Drawing Sheets

(51) Int. Cl.
*G01N 1/28* (2006.01)
*G01N 30/02* (2006.01)
*G01N 30/06* (2006.01)

(52) U.S. Cl.
CPC ................ *G01N 2001/2893* (2013.01); *G01N 2030/027* (2013.01); *G01N 2030/062* (2013.01)

(56) References Cited

FOREIGN PATENT DOCUMENTS

| | | | |
|---|---|---|---|
| CN | 111351866 | A | 6/2020 |
| CN | 111855867 | A | 10/2020 |
| CN | 112505178 | A | 3/2021 |
| JP | 2013011598 | A | 1/2013 |

* cited by examiner

FINGERPRINT SPECTRUM CONSTRUCTION METHOD FOR XIHUANG CAPSULES AND FINGERPRINT SPECTRUM

This application claims priority to Chinese Patent Application No. 202211281103.0, filed on Oct. 19, 2022, which is incorporated by reference for all purposes as if fully set forth herein.

FIELD OF THE INVENTION

The present invention relates to the field of quality control management of compound Chinese medicine preparations, and specifically to a fingerprint spectrum construction method for Xihuang capsules and a fingerprint spectrum.

DESCRIPTION OF THE RELATED ART

Xihuang capsule originated from Xihuang Pill, a medieval prescription recorded in the Life-saving Manual of Diagnosis and Treatment of External Diseases (Waike Zhengzhi Quansheng Ji) by Wang Hongxu, a famous physician in Qing Dynasty. It is prepared from *Calculus bovis, Moschus*, frankincense, and myrrha by modern technology. In the prescription, *Calculus bovis* is the main drug for clearing heart disease, relieving fever and eliminating phlegm, dredging orifices and dispelling swelling. *Moschus* is aromatic and spicy, and has the effects of dredging meridians, dispelling blood stasis and reducing swelling. Frankincense cooperates with the drugs to promote blood circulation, remove blood stasis, reduce swelling and pain. Therefore, the entire prescription has the effects of clearing away heat and toxic materials, promoting blood circulation, removing blood stasis and eliminating hard swelling. At present, Xihuang capsule is commonly used clinically to treat breast fibroma, breast cancer, cervical lymph node tuberculosis, lymphadenitis, osteomyelitis, appendicitis, suppurative dermatitis, multiple abscesses, bacteremia, acute suppurative infection, and malignant tumor. After years of clinical application, it has been proved to be a safe and reliable drug having a remarkable curative effect and a broad-spectrum anti-tumor effect. It is the first choice for treating tumor, tissue hyperplasia and infectious diseases, and is called "National anti-cancer drug of China".

At present, there are few quality detection methods for Xihuang capsules. Most of existing quality detection methods focus on the study of components of individual drugs in the prescription, and cannot reflect the overall composition information of Xihuang capsules. As a result, the quality of Xihuang capsules cannot be well controlled.

SUMMARY OF THE INVENTION

To overcome the disadvantages existing in the prior art, an objective of the present invention is to provide a fingerprint spectrum construction method for Xihuang capsules and a fingerprint spectrum. The method can accurately, clearly and objectively evaluate the quality of Xihuang capsules, and is of great significance and value for controlling the quality of Xihuang capsules and improving and ensuring the clinical efficacy of Xihuang capsules.

The present invention is accomplished through the following technical solutions:

A fingerprint spectrum construction method for Xihuang capsules, including the following steps:

S1: taking contents of a Xihuang capsule, adding a methanol-chloroform-phosphoric acid solution, and carrying out ultrasonic extraction to obtain a Xihuang capsule test solution;

S2: dissolving cholic acid, hyodeoxycholic acid, deoxycholic acid, bilirubin, muscone, and myrrhone in ethanol to obtain a mixed standard solution 1; dissolving quassin, 11-carbonyl-β-boswellic acid, 11-carbonyl-β-acetyl-boswellic acid, acetyl-11α-methoxy-β-boswellic acid, and sandaracopimaric acid in methanol to obtain a mixed standard solution 2;

S3: respectively injecting the Xihuang capsule test solution and the mixed standard solutions 1 and 2 into a high performance liquid chromatograph for chromatography, and recording corresponding chromatograms; and S4: constructing a fingerprint spectrum of the Xihuang capsule according to the chromatogram of the Xihuang capsule test solution and the chromatograms of the mixed standard solutions 1 and 2 obtained in the step S3.

Preferably, in the step S1, in the methanol-chloroform-phosphoric acid solution, the volume ratio of methanol to chloroform is 1:3, and the volume ratio of the total volume of methanol and chloroform to phosphoric acid is 100:0.2.

Preferably, in the step S3, a chromatographic column used in the high performance liquid chromatograph is Hypersil C18 ODS.

Preferably, in the step S3, mobile phases used in the chromatography include methanol, 0.08% phosphoric acid, and acetonitrile.

Further, in the step S3, in the chromatography, an ultraviolet-visible absorption detector is used to carry out measurement at a plurality of wavelengths: at 254 nm in 0-15 min, at 249 nm in 15-45 min, at 239 nm in 45-90 min, and at 210 nm in 90-110 min.

Further, in the step S3, a gradient elution procedure in the chromatography is: 0→15 min, methanol: 54%→65%, 0.08% phosphoric acid: 36%→25%; 15→45 min, methanol: 65%→78%, 0.08% phosphoric acid: 25%→12%; 45→55 min, methanol: 78%→80%, 0.08% phosphoric acid: 12%→10%; 55→65 min, methanol: 80%→82%, 0.08% phosphoric acid: 10%→8%; 65→75 min, methanol: 82%→84%, 0.08% phosphoric acid: 8%→6%; 75→90 min, methanol: 84%→86%, 0.08% phosphoric acid: 6%→4%; 90→100 min, methanol: 86%→88%, 0.08% phosphoric acid: 4%→2%; and 100→110 min, methanol: 88%→90%, 0.08% phosphoric acid: 2%→>0%.

Preferably, the step S4 further includes: importing chromatograms of test solutions of different batches of Xihuang capsules into a similarity evaluation system 2004A for chromatographic fingerprint spectra of Chinese medicines, selecting chromatographic peaks existing in all the chromatograms of the different batches of Xihuang capsules as common peaks, generating a reference fingerprint spectrum of the Xihuang capsules by using an averaging method, and calculating a relative retention time and a relative peak area of each of the common peaks; labeling chemical components of the common peaks in the reference fingerprint spectrum according to retention times in the chromatograms of the mixed standard solutions 1 and 2; generating a common chromatographic peak pattern according to the reference fingerprint spectrum R, obtaining a similarity between the chromatogram of each batch of Xihuang capsules and the common chromatographic peaks through analysis and calculation, and determining reliability of the chromatogram of the test solution of each batch of Xihuang capsules; and comparing the chromatogram of the Xihuang capsule test solution and the chromatograms of the mixed standard solutions 1 and 2 obtained in the step S3, and identifying that in the chromatogram: peak 3 represents myrrhone; peak 4 represents sandaracopimaric acid; peak 8 represents quassin; peak 10 represents muscone; peak 11 represents 11-carbonyl-β-boswellic acid; peak 12 represents 11-carbonyl-β-acetyl-boswellic acid; and peak 13 represents acetyl-11α-methoxy-β-boswellic acid, to obtain the fingerprint spectrum of the Xihuang capsule.

A fingerprint spectrum of a Xihuang capsule obtained by the construction method.

Compared with the prior art, the present invention has the following beneficial effects.

Chinese medicine fingerprint spectra can characterize the main chemical components of medicines comprehensively and macroscopically, and are recognized as one of the most suitable means for the quality control of chemical components of herbs and Chinese patent medicines at present. The combination of modern analytical technologies and Chinese medicine fingerprint spectra can comprehensively evaluate the quality of Chinese medicines with chemical substances that can reflect the material basis of efficacy of Chinese medicines, and is widely used in the formulation of quality standards of Chinese medicines. Based on this, the present invention provides a fingerprint spectrum construction method for Xihuang capsules. In the present invention, experimental investigation is carried out on different extraction methods and extraction solvents to optimize the extraction methods and solvents, and chromatograms with more information and high component content are obtained. The fingerprint spectrum determination method based on high performance liquid chromatography provided by the present invention has good adaptability, strong specificity, high precision, good stability and strong repeatability, meets the requirements for fingerprint spectrum construction, allows for more comprehensive and effective control of the clinical medication quality of Xihuang capsules to better ensure the safety and efficacy of Xihuang capsules, can be applied to the quality control of Xihuang capsules, and is of great significance for component identification, quality evaluation and quality standard formulation of Xihuang capsules. The fingerprint spectrum of the Xihuang capsule constructed by the method provided by the present invention has a total of 13 common characteristic peaks, among which 7 characteristic peaks are identified. In this way, the quality of Xihuang capsules can be effectively characterized, the sequence and relationship of fingerprint characteristic peaks can be objectively reflected. By paying attention to the overall characteristics, the present invention can avoid the inaccurate determination of the quality of Xihuang capsules by measuring only a single chemical component, and reduce the possibility of artificial treatment for reaching the quality standards.

DETAILED DESCRIPTION OF THE PREFERRED EMBODIMENTS

Figure 1:
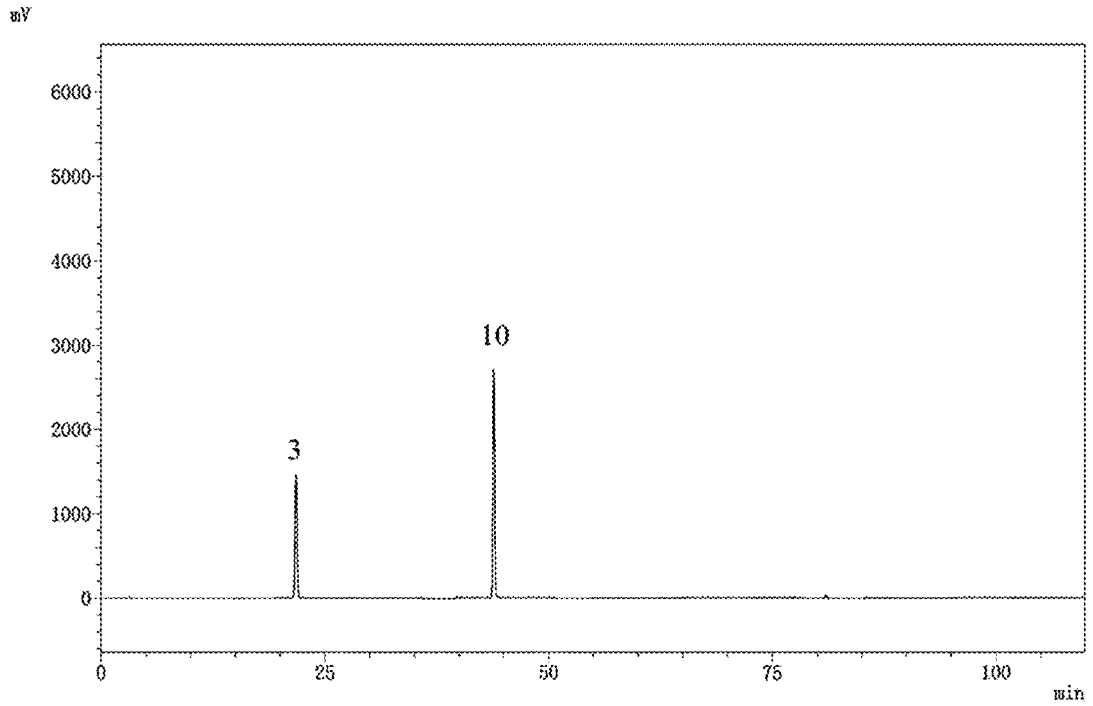
FIG. 1 is a chromatogram of a mixed standard 1 according to the present invention.

For a further understanding of the present invention, the present invention will be described below through examples. It should be understood that these descriptions are merely used for further explaining the features and advantages of the present invention and are not intended to limit the claims of the present invention.

1. A fingerprint spectrum construction method for Xihuang capsules, including the following steps.

S1: Preparation of Xihuang Capsule Test Solution:

Contents of different batches of Xihuang capsules are accurately weighed and placed in a conical flask with a stopper respectively, followed by addition of a methanol-chloroform-phosphoric acid solution and ultrasonic extraction. A filtrate is taken and filtered through a 0.45 μm microporous filter membrane to obtain a Xihuang capsule test solution.

S2: Preparation of Standard Solutions:

Cholic acid, hyodeoxycholic acid, deoxycholic acid, bilirubin, muscone, and myrrhone are accurately weighed and placed in a volumetric flask, followed by addition of ethanol to make up the volume to the mark, to obtain a mixed standard solution 1. Quassin, 11-carbonyl-β-boswellic acid, 11-carbonyl-β-acetyl-boswellic acid, acetyl-11α-methoxy-β-boswellic acid, and sandaracopimaric acid are accurately weighed and placed in a volumetric flask, followed by addition of ethanol to make up the volume to the mark, to obtain a mixed standard solution 2.

S3: The test solution obtained in the step S1 and the mixed standard solutions 1 and 2 obtained in the step S2 are respectively accurately taken and injected into a high performance liquid chromatograph, and chromatograms are recorded.

S4: The chromatograms of the Xihuang capsule test solutions obtained in the step (3) are exported and imported into a similarity evaluation system 2004A for chromatographic fingerprint spectra of Chinese medicines. Chromatographic peaks existing in all the chromatograms of the different batches of Xihuang capsules are selected as common peaks. There are a total of 13 common peaks. A reference fingerprint spectrum of the Xihuang capsules is generated by using an averaging method, and a relative retention time and a relative peak area of each of the common peaks are calculated. Chemical components of the peaks in the reference fingerprint spectrum are labeled according to retention times in the chromatograms of the mixed standard solutions 1 and 2. A common chromatographic peak pattern is generated according to the reference fingerprint spectrum R. A similarity between the chromatogram of each batch of Xihuang capsules and the common chromatographic peaks is obtained through analysis and calculation, and reliability of the chromatogram of the test solution of each batch of Xihuang capsules is determined.

S5: The chromatogram of the Xihuang capsule test solution and the chromatograms of the mixed standard solutions 1 and 2 obtained in the step S3 are compared, and it is identified that in the chromatogram of the Xihuang capsule: peak 3 represents myrrhone; peak 4 represents sandaracopimaric acid; peak 8 represents quassin; peak 10 represents muscone; peak 11 represents 11-carbonyl-β-boswellic acid; peak 12 represents 11-carbonyl-β-acetyl-boswellic acid; and peak 13 represents acetyl-11α-methoxy-β-boswellic acid, to obtain the fingerprint spectrum of the Xihuang capsule.

The method of preparing the Xihuang capsule test solution in the step S1 is preferably as follows: 240 mg of contents of each of 11 batches of Xihuang capsules is accurately weighed and placed in a 250 mL conical flask with a stopper, followed by addition of 100 mL of [methanol-chloroform (1:3)]-phosphoric acid (100:0.2) solution and ultrasonic extraction for 30 min. A filtrate is taken and filtered through a 0.45 μm microporous filter membrane to obtain the test solution.

The method of preparing the standard solutions in the step S2 is preferably as follows: cholic acid, hyodeoxycholic acid, deoxycholic acid, bilirubin, muscone, and myrrhone are accurately weighed and placed in a volumetric flask, followed by addition of ethanol to make up the volume to the mark, to obtain the mixed standard solution 1; and quassin, 11-carbonyl-β-boswellic acid, 11-carbonyl-β-acetyl-boswellic acid, acetyl-11α-methoxy-β-boswellic acid, and sandaracopimaric acid are accurately weighed and placed in a volumetric flask, followed by addition of ethanol to make up the volume to the mark, to obtain the mixed standard solution 2, where The concentrations of cholic acid, hyodeoxycholic acid, deoxycholic acid, bilirubin, muscone, myrrhone, quassin, 11-carbonyl-β-boswellic acid, 11-carbonyl-β-acetyl-boswellic acid, acetyl-11α-methoxy-β-boswellic acid, and sandaracopimaric acid in the obtained mixed standard solutions are respectively 200 μg/mL, 200 μg/mL, 200 g/mL, 40 μg/mL, 150 μg/mL, 150 μg/mL, 100 μg/mL, 100 μg/mL, 100 μg/mL, and 100 μg/mL, 150 μg/mL.

Conditions of the liquid chromatography in the step S3 are as follows: chromatographic column: Hypersil C18 ODS (4.6×250 mm×5 μm); mobile phase: methanol (A)-0.08% phosphoric acid (B)-acetonitrile (C), gradient elution; measurement by an ultraviolet-visible absorption detector at a plurality of wavelengths: at 254 nm in 0-15 min, at 249 nm in 15-45 min, at 239 nm in 45-90 min, and at 210 nm in 90-110 min; column temperature: 27° C.; flow rate: 0.6 mL/min; injection volume: 20 μL. The elution procedure is shown in Table 1 below.

TABLE 1

Elution procedure of liquid chromatography

| Time/min | Mobile | Mobile phase | Mobile | Wavelength/nm |
|---|---|---|---|---|
| 0 | 54 | 36 | 10 | 254 |
| 15 | 65 | 25 | 10 | 249 |
| 45 | 78 | 12 | 10 | 239 |
| 55 | 80 | 10 | 10 | 239 |
| 65 | 82 | 8 | 10 | 239 |

TABLE 1-continued

Elution procedure of liquid chromatography

| Time/min | Mobile | Mobile phase | Mobile | Wavelength/nm |
|---|---|---|---|---|
| 75 | 84 | 6 | 10 | 239 |
| 90 | 86 | 4 | 10 | 239 |
| 100 | 88 | 2 | 10 | 210 |
| 110 | 90 | 0 | 10 | 210 |

2. Optimization of Fingerprint Spectrum Determination:

S1. Optimization of Sample Solution Preparation:

In the present invention, experimental investigation is carried out on different extraction methods (ultrasonic, reflux, and impregnation). The results show that the spectrum obtained by ultrasonic extraction covers more components and has a good separation degree, so the ultrasonic extraction method is adopted.

In the present invention, extraction effects of different extraction solvents ([acetonitrile-chloroform (1:3)]-phosphoric acid (100:0.2) solution, methanol-chloroform (1:3) solution, and [methanol-chloroform (1:3)]-phosphoric acid (100:0.2) solution). The results show that when the [methanol-chloroform (1:3)]-phosphoric acid (100:0.2) solution is used as the extraction solvent, the chromatogram of the extracts has the most information and the highest component contents, so the [methanol-chloroform (1:3)]-phosphoric acid (100:0.2) solution is used for extraction.

S2. Optimization of Chromatographic Conditions:

In the present invention, an ultraviolet-visible absorption detector is used to investigate the detection wavelengths, and chromatograms at 254 nm, 249 nm, 239 nm, and 210 nm are extracted. It is found that the detection wavelength conditions are 254 nm in 0-15 min, 249 nm in 15-45 min, 239 nm in 45-90 min, and 210 nm in 90-110 min, the chromatogram contains the most comprehensive information and the baseline is stable, so this method is selected as the detection wavelength condition.

In the present invention, the flow rates (0.6 mL/min, 0.8 mL/min, and 1.0 mL/min) are screened, and it is found that when the flow rate is 0.6 mL/min, the peak characteristics and the separation degree are the best, so the flow rate is maintained at 0.6 mL/min.

In the present invention, the column temperatures (25° C., 27° C., and 30° C.) is screened, and the results show that the peak characteristics and the separation effect of components are the best when the column temperature is kept at 27° C., so the column temperature is finally selected as 27° C.

In the present invention, the elution effects of different elution systems including methanol-water, acetonitrile-water, methanol-0.3% phosphoric acid-water, acetonitrile-0.1% phosphoric acid-water, methanol-0.1% phosphoric acid-acetonitrile, and methanol-0.08% phosphoric acid-acetonitrile under different gradients are compared. The results show that the separation effect of components in the Xihuang capsule is good when methanol-0.08% phosphoric acid-acetonitrile is used as the mobile phase, so methanol-0.08% phosphoric acid-acetonitrile is finally selected as the mobile phase.

In the present invention, after the optimum mobile phase composition is determined, the optimal gradient elution procedure is selected through a large number of experiments, and the experiment finds that good resolution of chromatographic peaks in the chromatogram can be achieved when the following gradient elution procedure is used: 0→15 min, methanol: 54%→65%, 0.08% phosphoric acid: 36%→25%; 15→45 min, methanol: 65%→78%, 0.08% phosphoric acid: 25%→12%; 45→55 min, methanol: 78%→80%, 0.08% phosphoric acid: 12%→10%; 55→65 min, methanol: 80%→82%, 0.08% phosphoric acid: 10%→8%; 65→75 min, methanol: 82%→84%, 0.08% phosphoric acid: 8%→6%; 75→90 min, methanol: 84%→86%, 0.08% phosphoric acid: 6%→4%; 90→100 min, methanol: 86%→88%, 0.08% phosphoric acid: 4%→2%; and 100→110 min, methanol: 88%→90%, 0.08% phosphoric acid: 2%→0%.

The embodiments of the present invention will be described in detail below through examples. Where no specific conditions are given in the examples, conventional conditions or conditions recommended by the manufacturer are followed.

The reagents or instruments for which no manufacturers are noted are all common products commercially available from the market.

Instruments and reagents used in the examples were as follows:

Experimental Apparatus:

1. Instruments as Shown in Table 2

TABLE 2

Instruments used in the present invention

| Instrument name | Instrument model | Manufacturer |
|---|---|---|
| Electronic balance | TDD50002 | Bangyi Precision Measuring Instrument (Shanghai) Co., Ltd. |
| Electronic balance | LE204E/02 | Mettler Toledo Instruments (Shanghai) Co., Ltd. |
| Electronic balance | JCS-600 | Kaifeng Group Co., Ltd. |
| Ultrasonic cleaner | QD-100S | Shenzhen Qiangdun Electric Appliance Co., Ltd. |
| Ultra-pure water preparation system | MilliporeMilli-vPlus | Millipore, Bedford, MA, USA |
| Ultraviolet-visible dual-wavelength detector | SPD-16 | Shimadzu |
| Mass spectrometer | 6200 Series TOF/6500 | Agilent |
| High performance liquid chromatograph | LC-16 | Shimadzu (China) |
| Column core | 4.6 mm | Shanghai Titan Scientific Co., Ltd. |
| Syringe | 5 mL | Minank |
| Microporous filter membrane | 0.45 μm | JINTENG |
| Chromatographic column | Hypersil ODS 5 μm (250 × 4.6 mm) | Elite |

2. Drugs and Reagents

Batch numbers of 11 batches of Xihuang capsules were shown in Table 3 below.

TABLE 3

Batch numbers of Xihuang capsules of the present invention

| Batch | Batch number |
|---|---|
| 1 | XH210501 |
| 2 | XH210502 |
| 3 | XH210507 |
| 4 | XH210508 |
| 5 | XH210509 |
| 6 | XH210511 |
| 7 | XH210512 |
| 8 | XH210515 |
| 9 | XH210516 |
| 10 | XH210517 |
| 11 | XH210518 |

Reference substance: Cholic acid reference substance (batch number LY0307); Hyodeoxycholic acid reference substance (batch number LY0686); Deoxycholic acid reference substance (batch number LY0306); Bilirubin reference substance (batch number LY0305); Muscone reference substance (batch number LY0810); Myrrhone reference substance (batch number PCS1410); Sandaracopimaric acid reference substance (batch number R19618); Quassin reference substance (batch number BTQ509400); 11-carbonyl-β-boswellic acid reference substance (batch number LY0864); 11-carbonyl-β-acetyl-boswellic acid reference substance (batch number DS1195); Acetyl-11α-methoxy-β-boswellic acid reference substance (batch number HA015687). All the reference substances were purchased from China National Institutes for Food and Drug Control. Methanol (analytical grade); Phosphoric acid (analytical grade); Acetonitrile (chromatographic grade).

Example 1: A Fingerprint Spectrum Construction Method for Xihuang Capsules was Provided, Including the Following Steps S1: Preparation of Xihuang Capsule Test Solution:

240 mg of contents of each of 11 batches of Xihuang capsules was weighed and placed in a 250 mL conical flask with a stopper, followed by addition of 100 mL of [methanol-chloroform (1:3)]-phosphoric acid (100:0.2) solution and ultrasonic extraction for 30 min. A filtrate was taken and filtered through a 0.45 μm microporous filter membrane to obtain a test solution.

S2: Preparation of Standard Solutions:

Cholic acid, hyodeoxycholic acid, deoxycholic acid, bilirubin, muscone, and myrrhone were accurately weighed and placed in a volumetric flask, followed by addition of ethanol to make up the volume to the mark, to obtain a mixed standard solution 1. Quassin, 11-carbonyl-β-boswellic acid, 11-carbonyl-β-acetyl-boswellic acid, acetyl-11α-methoxy-β-boswellic acid, and sandaracopimaric acid were accurately weighed and placed in a volumetric flask, followed by addition of ethanol to make up the volume to the mark, to obtain a mixed standard solution 2. The concentrations of cholic acid, hyodeoxycholic acid, deoxycholic acid, bilirubin, muscone, myrrhone, quassin, 11-carbonyl-β-boswellic acid, 11-carbonyl-β-acetyl-boswellic acid, acetyl-11α-methoxy-β-boswellic acid, and sandaracopimaric acid in the obtained mixed standard solutions were respectively 200 μg/mL, 200 μg/mL, 200 g/mL, 40 μg/mL, 150 μg/mL, 150 μg/mL, 100 μg/mL, 100 μg/mL, 100 μg/mL, 100 g/mL, and 150 μg/mL.

S3: The test solutions of the 11 batches of Xihuang capsules and the standard solutions were respectively accurately taken and injected into a high performance liquid chromatograph, and chromatograms were recorded. Conditions of the liquid chromatography were as follows: chromatographic column: Hypersil C18 ODS (4.6×250 mm×5 μm); mobile phase: methanol (A)-0.08% phosphoric acid (B)-acetonitrile (C), gradient elution; measurement by an ultraviolet-visible absorption detector at a plurality of wavelengths: at 254 nm in 0-15 min, at 249 nm in 15-45 min, at 239 nm in 45-90 min, and at 210 nm in 90-110 min; column temperature: 27° C.; flow rate: 0.6 mL/min; injection volume: 20 μL. The elution procedure was shown in Table 1 below.

S4: The chromatograms of the test solutions of the 11 batches of Xihuang capsules obtained in the step (3) were exported and imported into a similarity evaluation system 2004A for chromatographic fingerprint spectra of Chinese medicines. Chromatographic peaks existing in all the chromatograms of the 11 batches of Xihuang capsules were selected as common peaks. A reference fingerprint spectrum R of the Xihuang capsules was generated by using an averaging method, and a relative retention time and a relative peak area of each of the common peaks were calculated. Chemical components of the peaks in the reference fingerprint spectrum were labeled according to retention times in the chromatograms of the standard solutions.

Figure 2:
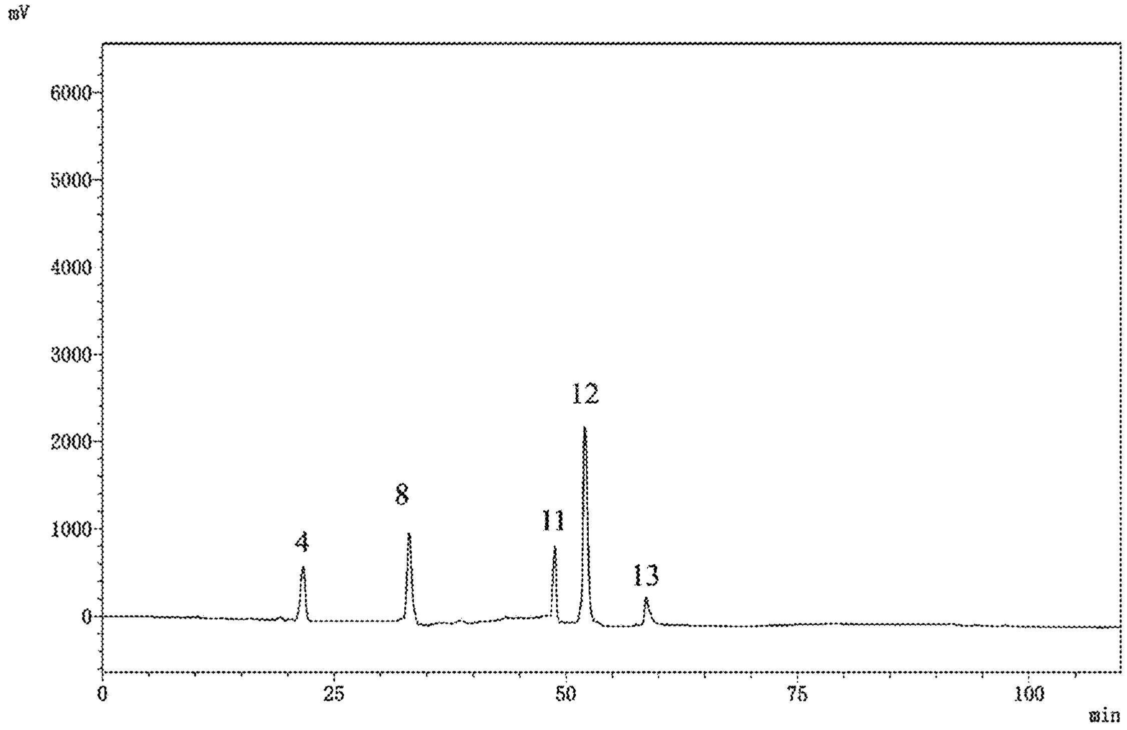
FIG. 2 is a chromatogram of a mixed standard 2 according to the present invention.
Figure 3:
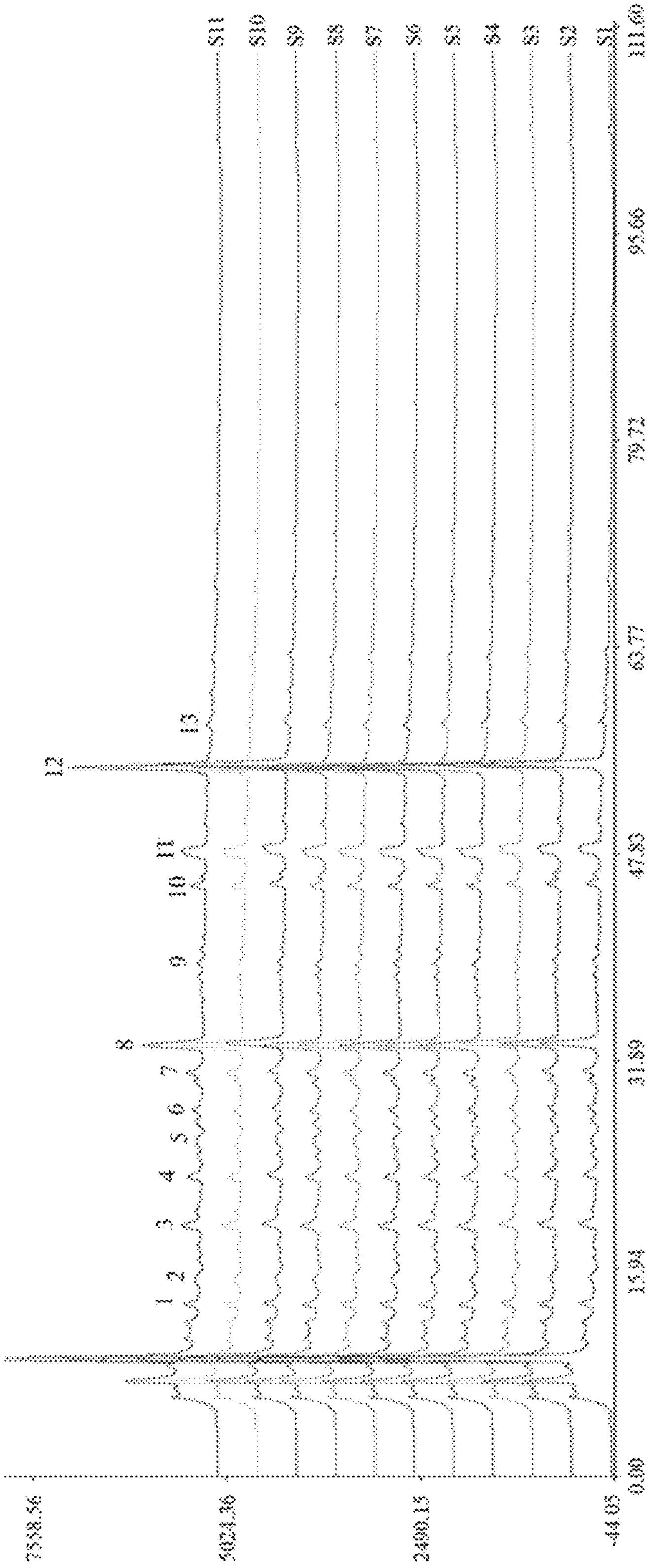
FIG. 3 shows fingerprint spectra of 11 batches of test samples of Xihuang capsules according to the present invention.
Figure 4:
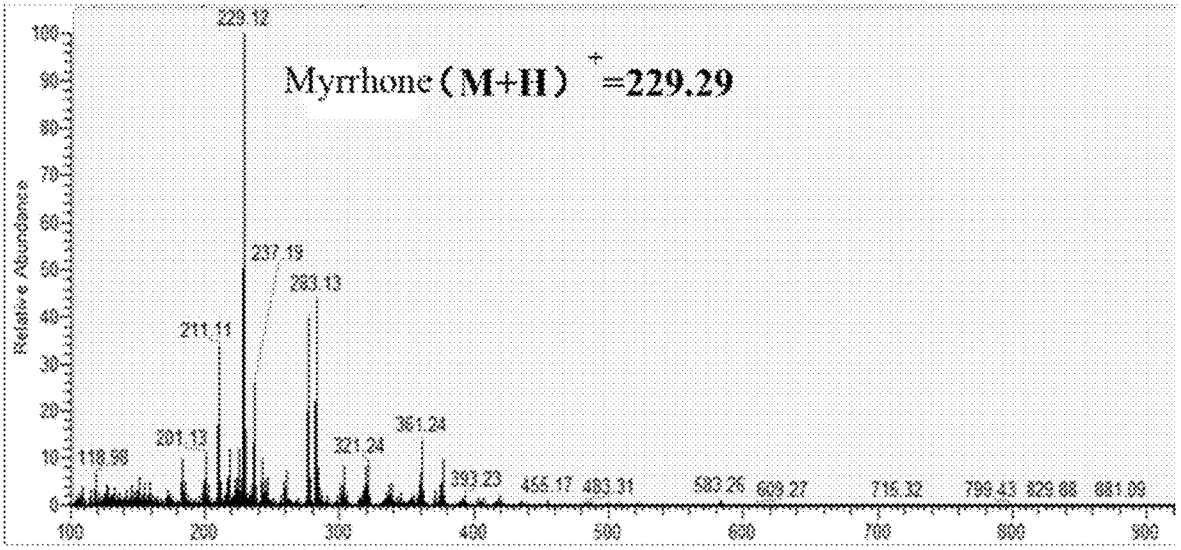
FIG. 4 is a mass spectrum of a myrrhone reference substance according to the present invention.
Figure 5:
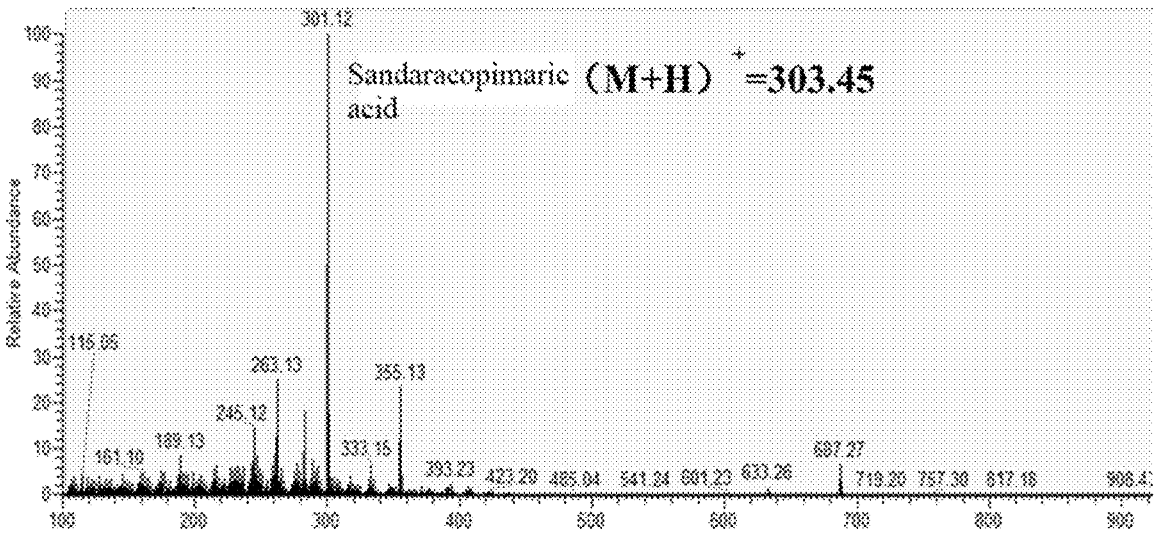
FIG. 5 is a mass spectrum of a sandaracopimaric acid reference substance according to the present invention.
Figure 6:
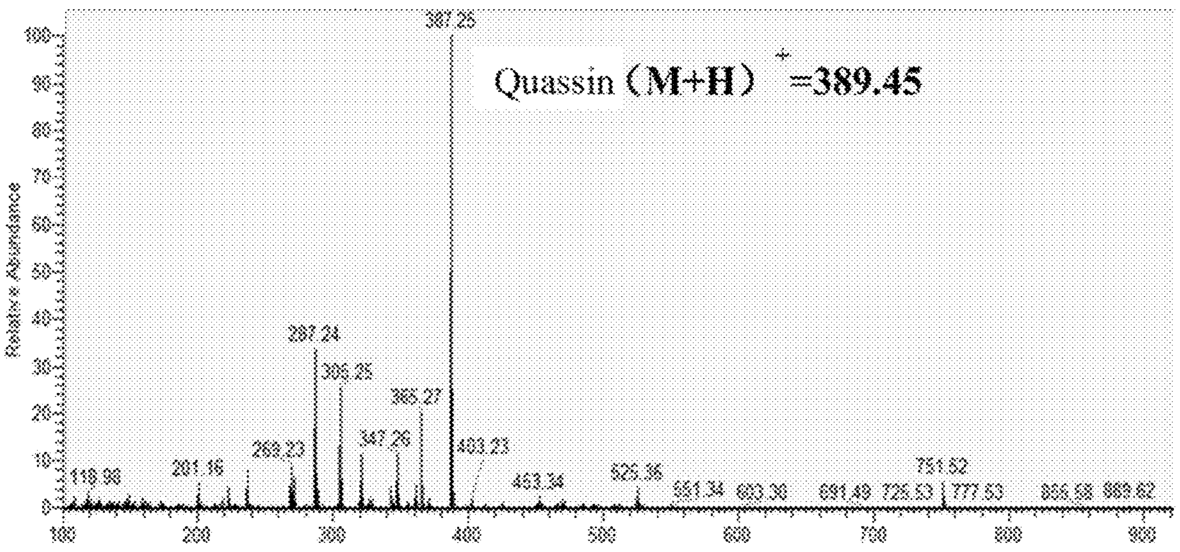
FIG. 6 is a mass spectrum of a quassin reference substance according to the present invention.
Figure 7:
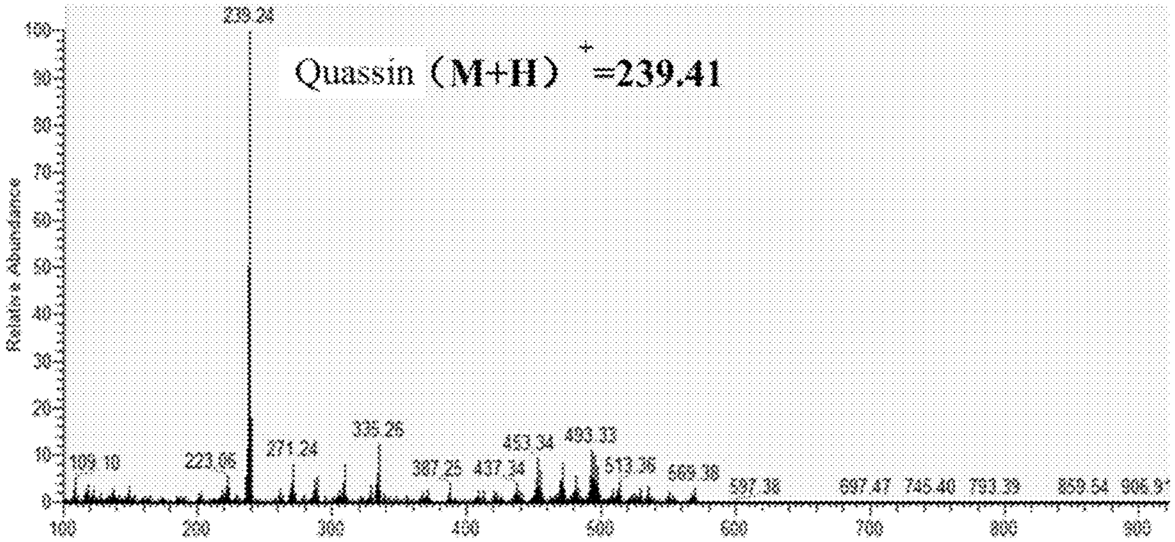
FIG. 7 is a mass spectrum of a muscone reference substance according to the present invention.
Figure 8:
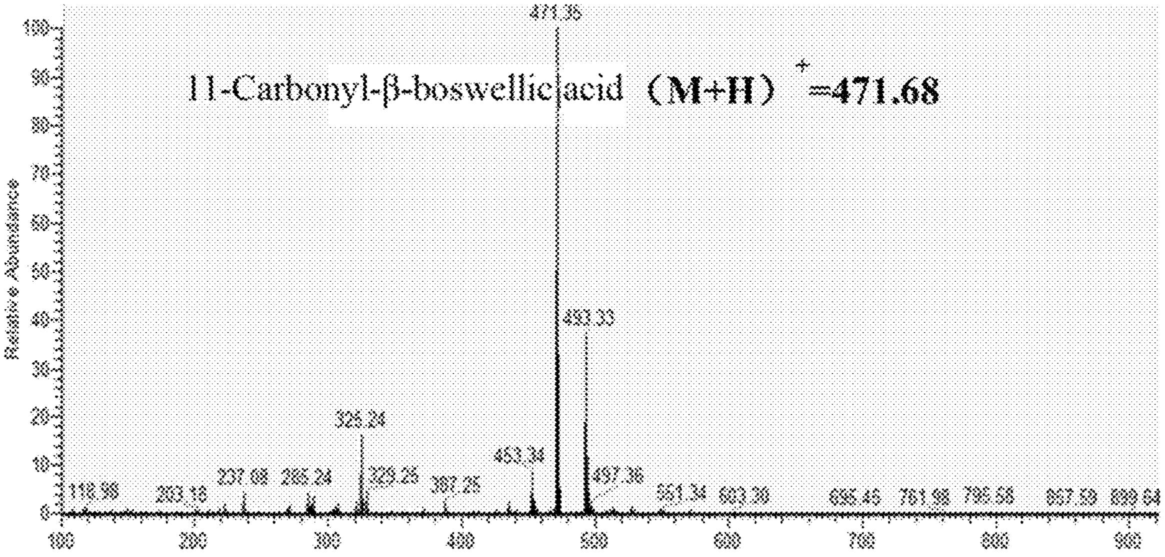
FIG. 8 is a mass spectrum of a 11-carbonyl-β-boswellic acid reference substance according to the present invention.
Figure 9:
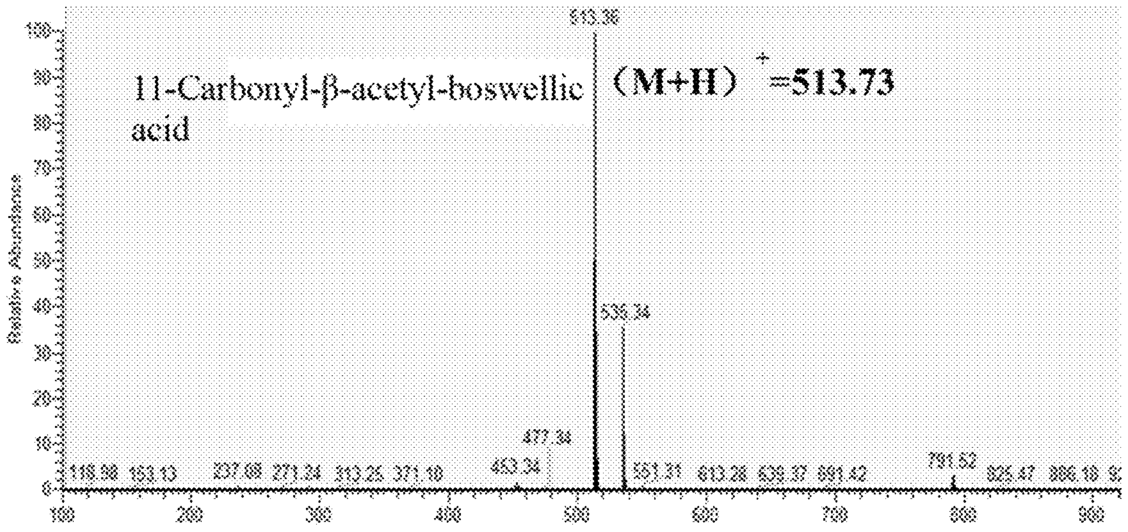
FIG. 9 is a mass spectrum of a 11-carbonyl-β-acetyl-boswellic acid reference substance according to the present invention.
Figure 10:
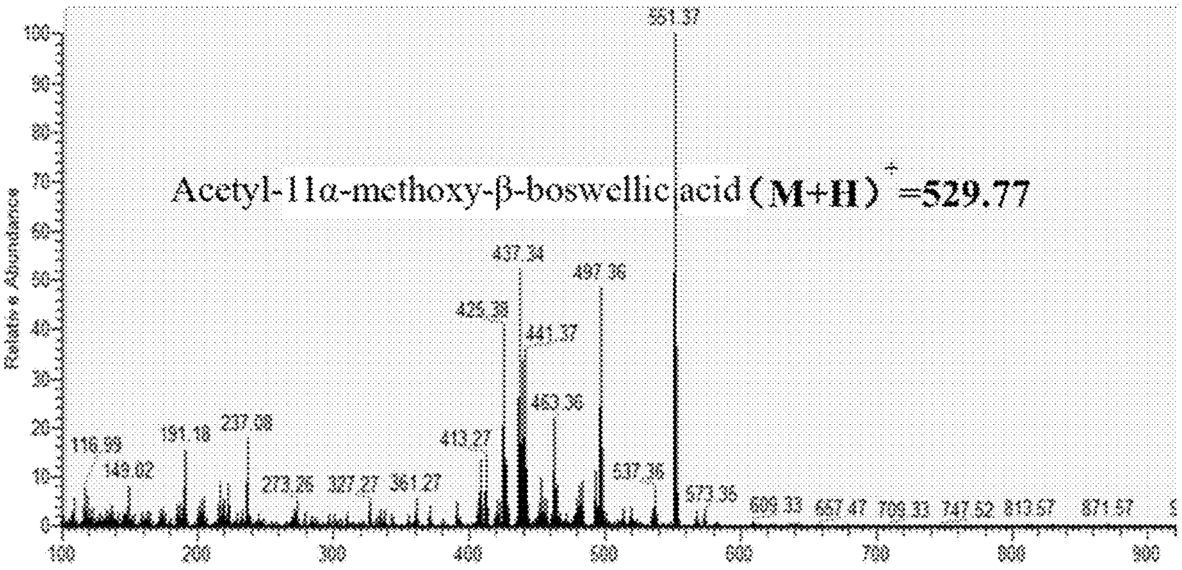
FIG. 10 is a mass spectrum of a acetyl-11α-methoxy-β-boswellic acid reference substance according to the present invention.

S5: The chromatogram (FIG. 3) of the Xihuang capsule test solution and the chromatograms (FIG. 1 and FIG. 2) of the standard solutions obtained in the step S3 were compared, and it was identified with reference to FIG. 4 to FIG. 10 that chromatographic peaks 3, 4, 8, 10, 11, 12, and 13 in the Xihuang capsule respectively represent myrrhone (with a retention time of 18.834 min), sandaracopimaric acid (with a retention time of 22.316 min), quassin (with a retention time of 33.579 min), muscone (with a retention time of 44.632 min), 11-carbonyl-β-boswellic acid (with a retention time of 49.086 min), 11-carbonyl-β-acetyl-boswellic acid (with a retention time of 53.643 min), and acetyl-11α-methoxy-β-boswellic acid (with a retention time of 58.967 min).

In addition, in the present invention, a common chromatographic peak pattern was generated according to the automatically generated reference fingerprint spectrum R. It is obtained through analysis and calculation that there is a desirable similarity between the common chromatographic peaks of the 11 batches of Xihuang capsules, indicating that the fingerprint spectrum of the Xihuang capsule constructed by the method can well determine the components of Xihuang capsules and the quality of the 11 batches of Xihuang capsules. The results were shown in Table 4.

TABLE 4

Similarity between each batch of samples and the common chromatographic peak pattern

| | S1 | S2 | S3 | S4 | S5 | S6 | S7 | S8 | S9 | S10 | S11 | Reference fingerprint spectrum |
|---|---|---|---|---|---|---|---|---|---|---|---|---|
| S1 | 1 | 0.998 | 0.984 | 0.907 | 0.945 | 0.926 | 0.945 | 0.952 | 0.978 | 0.942 | 0.935 | 0.960 |
| S2 | 0.998 | 1 | 0.998 | 0.905 | 0.917 | 0.935 | 0.938 | 0.948 | 0.965 | 0.948 | 0.942 | 0.958 |
| S3 | 0.984 | 0.998 | 1 | 0.937 | 0.965 | 0.907 | 0.945 | 0.952 | 0.998 | 0.952 | 0.974 | 0.960 |
| S4 | 0.907 | 0.905 | 0.937 | 1 | 0.979 | 0.967 | 0.979 | 0.987 | 0.905 | 0.987 | 0.979 | 0.964 |
| S5 | 0.945 | 0.917 | 0.965 | 0.979 | 1 | 0.979 | 0.965 | 0.990 | 0.942 | 0.990 | 0.937 | 0.942 |
| S6 | 0.926 | 0.935 | 0.907 | 0.967 | 0.979 | 1 | 0.979 | 0.987 | 0.905 | 0.987 | 0.979 | 0.964 |
| S7 | 0.945 | 0.938 | 0.945 | 0.979 | 0.965 | 0.979 | 1 | 0.990 | 0.942 | 0.990 | 0.965 | 0.942 |
| S8 | 0.952 | 0.948 | 0.952 | 0.987 | 0.990 | 0.987 | 0.990 | 1 | 0.968 | 0.963 | 0.990 | 0.945 |
| S9 | 0.978 | 0.965 | 0.998 | 0.905 | 0.942 | 0.905 | 0.942 | 0.968 | 1 | 0.948 | 0.942 | 0.958 |
| S10 | 0.942 | 0.948 | 0.952 | 0.987 | 0.990 | 0.987 | 0.990 | 0.963 | 0.948 | 1 | 0.990 | 0.945 |
| S11 | 0.935 | 0.942 | 0.974 | 0.979 | 0.937 | 0.979 | 0.965 | 0.990 | 0.942 | 0.990 | 1 | 0.942 |
| Reference fingerprint spectrum | 0.960 | 0.958 | 0.960 | 0.964 | 0.942 | 0.964 | 0.942 | 0.945 | 0.958 | 0.945 | 0.942 | 1 |

Example 2 Methodological Study on the Fingerprint Spectrum Determination Method S1. Study on the Precision The standard solution prepared by the method of Example 1 was taken and analyzed according to the method of Example 1. The sample was injected in parallel for 6 times with an injection volume of 20 μL. Peak areas and retention times were analyzed and relative standard deviation (RSD) values were calculated. The results were shown in Table 5, indicating good precision of parallel injection of the equipment.

TABLE 5

Peak area and retention time of the study on the precision

| No. | Name | Indicator | 1 | 2 | 3 | 4 | 5 | 6 | RSD (%) |
|---|---|---|---|---|---|---|---|---|---|
| 1 | Myrrhone | Retention time (min) | 19.408 | 19.410 | 19.246 | 19.238 | 19.274 | 19.234 | 0.403 |
| | | Peak area (A) | 24769565 | 25099617 | 26364908 | 25454164 | 26798999 | 26364908 | 2.882 |
| 2 | Sandaracopimaric acid | Retention time (min) | 23.177 | 23.169 | 22.983 | 22.974 | 23.006 | 23.006 | 0.371 |
| | | Peak area (A) | 23809727 | 24140068 | 25808293 | 24681430 | 25446067 | 25008293 | 2.800 |

TABLE 5-continued

Peak area and retention time of the study on the precision

| No. | Name | Indicator | 1 | 2 | 3 | 4 | 5 | 6 | RSD (%) |
|---|---|---|---|---|---|---|---|---|---|
| 3 | Quassin | Retention time (min) | 33.281 | 33.282 | 33.105 | 33.104 | 33.118 | 33.281 | 0.262 |
| | | Peak area (A) | 43683818 | 43793209 | 45822767 | 43477851 | 46696732 | 43683818 | 2.821 |
| 4 | Muscone | Retention time (min) | 45.598 | 45.603 | 45.397 | 45.399 | 45.418 | 45.603 | 0.222 |
| | | Peak area (A) | 12569998 | 12970378 | 12019782 | 12509872 | 11946877 | 12509872 | 2.804 |
| 5 | 11-carbonyl-β-boswellic acid | Retention time (min) | 48.165 | 48.163 | 48.989 | 48.99 | 48.004 | 48.165 | 0.850 |
| | | Peak area (A) | 22157683 | 22653639 | 23301275 | 22549872 | 23837003 | 22157683 | 2.682 |
| 6 | 11-carbonyl-β-acetyl-boswellic acid | Retention time (min) | 54.801 | 54.792 | 54.522 | 54.535 | 54.521 | 54.792 | 0.251 |
| | | Peak area (A) | 100132573 | 103647848 | 98230552 | 97509872 | 97023318 | 103647848 | 2.731 |
| 7 | Acetyl-11α-methoxy-β-boswellic acid | Retention time (min) | 58.126 | 58.118 | 57.819 | 57.833 | 57.820 | 57.819 | 0.246 |
| | | Peak area (A) | 2458942 | 2534881 | 2538346 | 2648211 | 2644234 | 2538346 | 2.605 |

S2. Study on the Stability 1.25 g of contents of the Xihuang capsule was taken to prepare a test solution according to the method of Example 1. The test solution was analyzed according to the method of Example 1. The test solution was taken at 0, 2, 6, 12, 18, and 24 h respectively for analysis, with an injection volume of 20 μL. Myrrhone, sandaracopimaric acid, quassin, muscone, 11-carbonyl-β-boswellic acid, 11-carbonyl-β-acetyl-boswellic acid, and acetyl-11α-methoxy-β-boswellic acid were used as reference peaks. Peak areas and retention times of common peaks in the HPLC fingerprint spectrum of the sample were analyzed, and RSD values were calculated. The results were shown in Table 6, indicating that the chromatographic peaks of the Xihuang capsule test solution almost remained unchanged within 24 hours.

TABLE 6

Peak area and retention time of the study on the stability

| No. | Name | Indicator | 0 h | 2 h | 4 h | 8 h | 12 h | 24 h | RSD (%) |
|---|---|---|---|---|---|---|---|---|---|
| 1 | Myrrhone | Retention time (min) | 19.476 | 19.630 | 19.568 | 19.630 | 19.389 | 19.405 | 0.514 |
| | | Peak area (A) | 24284137 | 23717952 | 24122680 | 24455223 | 24169396 | 24455223 | 1.044 |
| 2 | Sandaracopimaric acid | Retention time (min) | 23.283 | 23.429 | 23.361 | 23.429 | 23.145 | 23.170 | 0.491 |
| | | Peak area (A) | 21244325 | 21880162 | 22611716 | 22611716 | 23161403 | 22388399 | 2.732 |
| 3 | Quassin | Retention time (min) | 33.525 | 33.615 | 33.492 | 33.492 | 33.240 | 33.273 | 0.410 |
| | | Peak area (A) | 41486375 | 41688855 | 42440686 | 42651564 | 42651564 | 43006675 | 1.291 |
| 4 | Muscone | Retention time (min) | 45.924 | 46.008 | 45.852 | 45.852 | 45.565 | 45.589 | 0.362 |
| | | Peak area (A) | 13076051 | 13195865 | 12922298 | 13176051 | 13053572 | 13317296 | 0.952 |
| 5 | 11-carbonyl-β-boswellic acid | Retention time (min) | 48.347 | 48.461 | 48.368 | 48.158 | 48.125 | 48.158 | 0.266 |
| | | Peak area (A) | 20462225 | 20270295 | 20141401 | 20745491 | 21745491 | 20904968 | 2.564 |
| 6 | 11-carbonyl-β-acetyl-boswellic acid | Retention time (min) | 55.238 | 55.330 | 55.160 | 54.793 | 54.768 | 54.793 | 0.432 |
| | | Peak area (A) | 106462335 | 106719255 | 106724941 | 106724941 | 103363728 | 104271417 | 1.292 |
| 7 | Acetyl-11α-methoxy-β-boswellic acid | Retention time (min) | 58.616 | 58.730 | 58.531 | 58.616 | 58.083 | 58.108 | 0.445 |
| | | Peak area (A) | 2097953 | 2115534 | 2156624 | 2149994 | 2176382 | 2149994 | 1.231 |

S3. Study on the Repeatability

Six batches of sample solutions were prepared according to the test solution preparation method in Example 1. The chromatographic conditions in Example 1 were used, and the injection volume was 20 μL. Myrrhone, sandaracopimaric acid, quassin, muscone, 11-carbonyl-β-boswellic acid, 11-carbonyl-β-acetyl-boswellic acid, and acetyl-11α-methoxy-β-boswellic acid were used as reference peaks. Peak areas and retention times of common peaks in the HPLC fingerprint spectrum of the sample were analyzed, and RSD values were calculated. The results were shown in Table 4, indicating good reproducibility of the chromatographic peaks of the samples and good repeatability of this method.

TABLE 7

Peak area and retention time of the study on the repeatability

| No. | Name | Indicator | 1 | 2 | 3 | 4 | 5 | 6 | RSD (%) |
|---|---|---|---|---|---|---|---|---|---|
| 1 | Myrrhone | Retention time (min) | 19.244 | 19.293 | 19.307 | 19.294 | 19.300 | 19.340 | 0.151 |
| | | Peak area (A) | 27565780 | 27183058 | 27154792 | 26956410 | 27063845 | 27343071 | 0.731 |
| 2 | Sandaracopimaric acid | Retention time (min) | 23.008 | 23.049 | 23.069 | 23.056 | 23.055 | 23.098 | 0.124 |
| | | Peak area (A) | 22321069 | 21754603 | 21856563 | 22083920 | 21974888 | 22015103 | 0.810 |
| 3 | Quassin | Retention time (min) | 33.110 | 33.164 | 33.180 | 33.182 | 33.194 | 33.236 | 0.115 |
| | | Peak area (A) | 41562335 | 41926964 | 41879502 | 42012011 | 42161927 | 42145195 | 0.482 |
| 4 | Muscone | Retention time (min) | 45.421 | 45.456 | 45.479 | 45.480 | 45.527 | 45.547 | 0.092 |
| | | Peak area (A) | 13523887 | 13134250 | 12897137 | 12982871 | 12897997 | 12988730 | 1.666 |
| 5 | 11-carbonyl-β-boswellic acid | Retention time (min) | 48.020 | 48.064 | 48.084 | 48.082 | 48.086 | 48.134 | 0.075 |
| | | Peak area (A) | 23523887 | 23134250 | 22897137 | 22982871 | 22897997 | 22988730 | 0.944 |
| 6 | 11-carbonyl-β-acetyl-boswellic acid | Retention time (min) | 54.627 | 54.655 | 54.686 | 54.689 | 54.712 | 54.730 | 0.060 |
| | | Peak area (A) | 105051979 | 106070496 | 104062779 | 106228308 | 103497000 | 104862724 | 0.940 |
| 7 | Acetyl-11α-methoxy-β-boswellic acid | Retention time (min) | 57.884 | 57.929 | 57.956 | 57.963 | 58.013 | 58.011 | 0.081 |
| | | Peak area (A) | 2264988 | 2265691 | 2287992 | 2328907 | 2302795 | 2308029 | 1.001 |

The above test results show that the fingerprint spectrum construction method for Xihuang capsules according to the present invention has the characteristics of good stability, high precision, and good repeatability, and can comprehensively and objectively evaluate the quality of Xihuang capsules, to provide quality assurance for the clinical efficacy.

The above embodiments are merely preferred embodiments of the present invention, and is not intended to limit the present invention. The protection scope of the present invention is defined by the claims. The above contents are merely for describing the concept of the present invention by way of example. Various modifications, supplements, or similar replacements made to the specific embodiments described by those skilled in the art shall fall within the protection scope of the present invention, as long as they do not depart from the concept or go beyond the scope as defined by the appended claims.

What is claimed is:

1. A fingerprint spectrum construction method for Xihuang capsules, comprising:

S1: taking contents of a Xihuang capsule, adding a methanol-chloroform-phosphoric acid solution, and carrying out ultrasonic extraction to obtain a Xihuang capsule test solution;

S2: dissolving cholic acid, hyodeoxycholic acid, deoxycholic acid, bilirubin, muscone, and myrrhone in ethanol to obtain a mixed standard solution 1; dissolving quassin, 11-carbonyl-β-boswellic acid, 11-carbonyl-β-acetyl-boswellic acid, acetyl-11α-methoxy-β-boswellic acid, and sandaracopimaric acid in methanol to obtain a mixed standard solution 2;

S3: respectively injecting the Xihuang capsule test solution and the mixed standard solutions 1 and 2 into a high performance liquid chromatograph for chromatography, and recording corresponding chromatograms; and S4: constructing a fingerprint spectrum of the Xihuang capsule according to the chromatogram of the Xihuang capsule test solution and the chromatograms of the mixed standard solutions 1 and 2 obtained in the step S3.

2. The fingerprint spectrum construction method for Xihuang capsules according to claim 1, wherein in the step S1, in the methanol-chloroform-phosphoric acid solution, the volume ratio of methanol to chloroform is 1:3, and the volume ratio of the total volume of methanol and chloroform to phosphoric acid is 100:0.2.

3. The fingerprint spectrum construction method for Xihuang capsules according to claim 1, wherein in the step S3, a chromatographic column used in the high performance liquid chromatograph is Hypersil C18 ODS.

4. The fingerprint spectrum construction method for Xihuang capsules according to claim 1, wherein in the step S3, mobile phases used in the chromatography comprise methanol, 0.08% phosphoric acid, and acetonitrile.

5. The fingerprint spectrum construction method for Xihuang capsules according to claim 4, wherein in the step S3, in the chromatography, an ultraviolet-visible absorption detector is used to carry out measurement at a plurality of wavelengths: at 254 nm in 0-15 min, at 249 nm in 15-45 min, at 239 nm in 45-90 min, and at 210 nm in 90-110 min.

6. The fingerprint spectrum construction method for Xihuang capsules according to claim 4, wherein in the step S3, a gradient elution procedure in the chromatography is: 0→15 min, methanol: 54%→65%, 0.08% phosphoric acid: 36%→25%; 15→45 min, methanol: 65%→78%, 0.08% phosphoric acid: 25%→12%; 45→55 min, methanol: 78%→80%, 0.08% phosphoric acid: 12%→10%; 55→65 min, methanol: 80%→82%, 0.08% phosphoric acid: 10%→8%; 65→75 min, methanol: 82%→84%, 0.08% phosphoric acid: 8%→6%; 75→90 min, methanol: 84%→86%, 0.08% phosphoric acid: 6%→4%; 90→100 min, methanol: 86%→88%, 0.08% phosphoric acid: 4%→2%; and 100→110 min, methanol: 88%→90%, 0.08% phosphoric acid: 2%→0%.

7. The fingerprint spectrum construction method for Xihuang capsules according to claim 1, wherein the step S4 further comprises: importing chromatograms of test solutions of different batches of Xihuang capsules into a similarity evaluation system 2004A for chromatographic fingerprint spectra of Chinese medicines, selecting chromatographic peaks existing in all the chromatograms of the different batches of Xihuang capsules as common peaks, generating a reference fingerprint spectrum of the Xihuang capsules by using an averaging method, and calculating a relative retention time and a relative peak area of each of the common peaks; labeling chemical components of the common peaks in the reference fingerprint spectrum according to retention times in the chromatograms of the mixed standard solutions 1 and 2; generating a common chromatographic peak pattern according to the reference fingerprint spectrum R, obtaining a similarity between the chromatogram of each batch of Xihuang capsules and the common chromatographic peaks through analysis and calculation, and determining reliability of the chromatogram of the test solution of each batch of Xihuang capsules; and comparing the chromatogram of the Xihuang capsule test solution and the chromatograms of the mixed standard solutions 1 and 2 obtained in the step S3, and identifying that in the chromatogram: peak 3 represents myrrhone; peak 4 represents sandaracopimaric acid; peak 8 represents quassin; peak 10 represents muscone; peak 11 represents 11-carbonyl-β-boswellic acid; peak 12 represents 11-carbonyl-β-acetyl-boswellic acid; and peak 13 represents acetyl-11α-methoxy-β-boswellic acid, to obtain the fingerprint spectrum of the Xihuang capsule.

8. A fingerprint spectrum of a Xihuang capsule obtained by the construction method according to claim 1.

* * * * *